Figure 1:
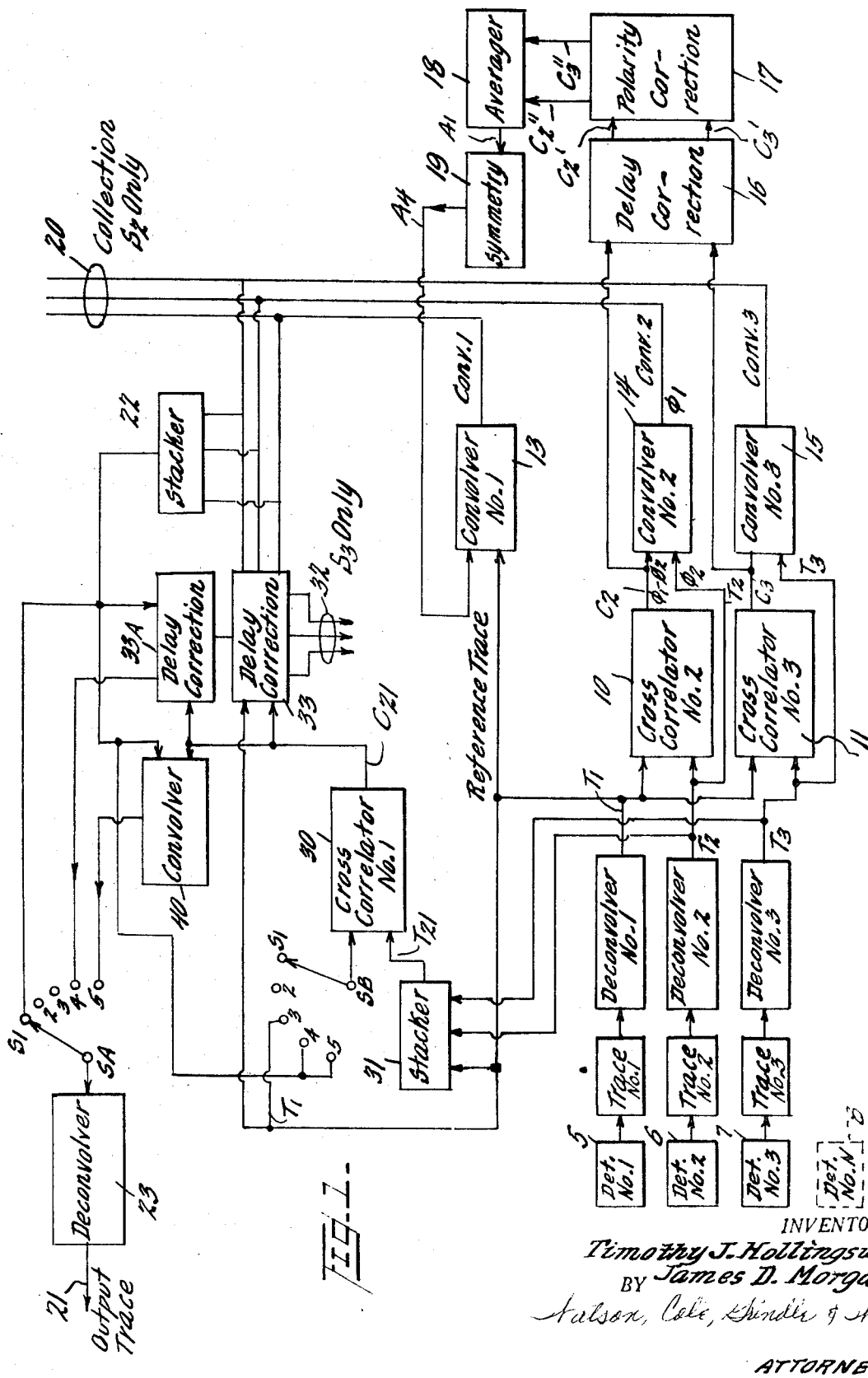

United States Patent

[11] 3,599,175

[72] Inventors Timothy J. Hollingsworth;
James D. Morgan, both of San Antonio, Tex.
[21] Appl. No. 857,605
[22] Filed Sept. 12, 1969
[45] Patented Aug. 10, 1971
[73] Assignee Petty Geophysical Engineering Co.
San Antonio, Tex.
Continuation of application Ser. No. 606,245, Dec. 30, 1966, now abandoned.

[54] SYSTEM AND METHODS OF PROCESSING SEISMIC DATA AND THE LIKE
3 Claims, 2 Drawing Figs.
[52] U.S. Cl. .................................................. 340/15.5 AC, 340/15.5 MC
[51] Int. Cl. .................................................. G01v 1/28
[50] Field of Search .......................................... 340/15.5 MC

[56] References Cited
UNITED STATES PATENTS
3,217,289  11/1965  Elliot et al. .................. 340/15.5

Primary Examiner—Rodney D. Bennett, Jr.
Assistant Examiner—Daniel C. Kaufman
Attorney—Watson, Cole, Grindle & Watson ABSTRACT: This invention discloses data processing system embodiments and methods for analyzing a set of seismic signals, which embodiments and methods are useful for processing other sets of signals of this sort. Thus, signals recorded from a set of spaced seismic detectors and preliminarily processed for availability in recorded form are reproduced and cross-correlated against a reference signal which typically is derived from the output of the detector closest to the seismic impact or shot source. The resulting signals are further processed to correct for any variations in timing and polarity and are averaged together as a single signal trace. In this form the signals, which have an amplitude peak at midpoint, are halved and one-half is symmetrically reproduced on either side of the midpoint to produce a modified signal, which may be convolved against the reference signal to form one signal in a collection with others obtained from convolving each trace with its corresponding cross-correlated signal. This collection may be further processed by simply stacking, or by correcting for delays by comparison with the reference trace, to provide a single output trace after deconvolution. In some cases the stacked trace may be convolved with a trace derived from a stacked collection of the original recorded traces cross-correlated with the reference trace, which resulting trace is deconvolved to produce a single output trace.

SYSTEM AND METHODS OF PROCESSING SEISMIC DATA AND THE LIKE

This application is a continuation of applicants' copending application, Ser. No. 606,245, filed Dec. 30, 1966 and now abandoned.

This invention relates to processing a set of related signals derived from a plurality of sources, such as seismic signal recordings, and it relates more particularly to processing certain of such related signals relative to others to enhance certain signal characteristics by selectively increasing the signal to noise ratio of these characteristics.

Any sort of signals or data taken from a single object and reflecting different perspectives can be analyzed in this manner, and specifically seismic signals are advantageously processed by the contributions of this invention. For example, the present invention is useful in conjunction with the stacking or combining of a set of signals reflected from the same common reflection point as taught in the U.S. Pat. No. 2,732,906, issued to William Harry Mayne.

This invention is particularly applicable to signal enhancement where (1) a limited number of signals are available, (2) the exact time correlation between signals is unknown or questionable, and (3) the signals may have somewhat different frequency responses. The invention can be applied to processing a series of EEG records, electromyograph records, and similar voltages or sound in medical electronics. It is also applicable to underwater measurements, and many other uses.

Certain types of processing of such signals are known in the art.

Thus, a review of conventional correlation techniques is found in an article entitled "Correlation Techniques—A Review," by N.A. Anstey, published in Geophysical Prospecting, Vol. 12, No. 4, Dec. 1964, pp. 355—382. Some equipment of this type is shown in the corresponding U.S. Pat. No. 3,271,732 to Anstey et al., or in the article entitled "An Analog Electronic Correlator for Acoustic Measurements" by K. W. Goff, published in *The Journal of the Acoustical Society of America*, Vol. 27, No. 2, Mar. 1955, pp. 223—236. Other analog and digital techniques of this sort are well known and commercial equipment is available from Sony, Dresser SIE, Inc. and Technical Measurement Corp., for example.

Also, convolution or filtering of seismic or similar records is well known as well as the sort of apparatus necessary to accomplish this sort of data processing. An article in Geophysics, Vol. 20, No. 4, Oct. 1955, entitled "Magnetic Delay Line Filtering Techniques" by H. J. Jones et al., treats this subject matter as well as a further article in the same publication Vol. XXIX, No. 3, June 1964, pp. 395—404 by E. A. Robinson and S. Treitel entitled "Principles of Digital Filtering."

It is one object of the present invention to improve prior art seismic signal set processing by providing signal processing systems and methods for selectively correcting noise, frequency, and phase characteristics of a stacked signal to enhance different signal characteristics so that the geological structure may better be recognized and evaluated.

A more specific object of the invention is to provide signal processing procedures which permit display of signal-time displacements, corresponding to velocity variations, in clearer form so that such variations can be more easily recognized and studied by seismologists to locate stratigraphic changes.

Another object of the invention is to reduce the possibility of static trace correction error.

A further object of the invention is to enhance primary reflections and reduce distortions such as from multiple reflections.

Another object of the invention is to compensate for difference in seismic travel times in the near surface media.

Yet another object of the invention is to provide comparable frequency responses throughout a plurality of traces.

These and further objects and advantages are realized by processing data signals from a plurality of sources through a network of steps of correlating, filtering, stacking, and time delaying which enhance various aspects of the signals when consulted either collectively or comparatively after the processing steps. Basically, the signals are cross-correlated with a selected reference trace, which is one of the basic signals. This provides different output signals obtained by way of different processing routes which may be compared in trace form or collection form for similarities or differences which enhance the ability to recognize significant signal characteristics.

For purposes of discussion hereinafter a "trace" is defined as a signal in either analog or digital form provided from either an original source or a processing source in a sequentially progressing form such as a magnetic record or a real time signal sequence. A "collection" is a set of traces in which each trace retains its identity, in an individual electrical channel, magnetic track or visual trace, but is grouped with all other traces in the set so as to facilitate intercomparison.

In general, the processing steps defined by this invention may be accomplished by manual graphing methods, by analog or digital signal processing or by combinations of these.

A specific basic processing procedure of this invention is exemplified by the cross-correlation of a single reference trace with each of the traces in a set of traces, and further processing the cross-correlated signals to modify at least one specific signal characteristic such as frequency, phase symmetry, amplitude, or time reference. This latter processing might comprise deriving a trace with static average corrections from a plurality of cross-correlated traces, and convolving this derived trace with the reference trace to provide a resulting trace in a collection of traces which may be stacked to produce a further signal trace. Comprehensive sets of signal traces which undergo different processing phases such as deconvolution, symmetry correction and stacking are selectable at will by variations of the basic processing procedure to enhance various signal characteristics with respect to velocity, frequency noise, ringing, etc.

Figure 2:
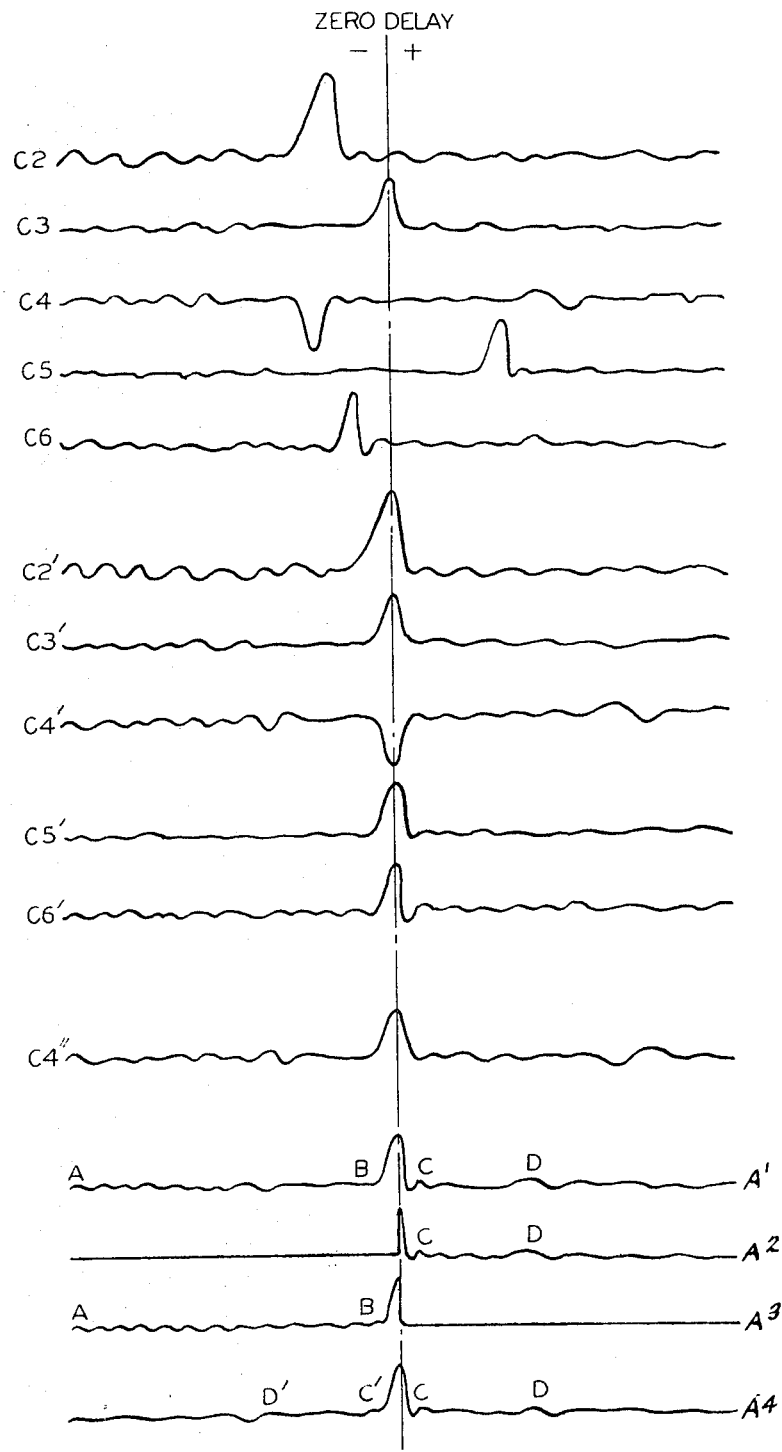

Further aspects of the invention and its details are found throughout the following specification while making reference to the accompanying drawings wherein:

FIG. 1 is a block diagram of a signal processing system afforded by this invention, and FIG. 2 is a set of typical waveforms related to illustrate the manner of processing signals afforded by this invention.

As may be seen in FIG. 1, a set of normally processed signal traces $T_1$, $T_2$, $T_3$ are derived from a set of corresponding detectors 5, 6, 7 such as geophones, preferably using an intermediate magnetic tape recording. A plurality of N signals may be employed similarly, as exemplified by detector 8, but this diagram is simplified by characteristic handling of only signal traces $T_1$, $T_2$, and $T_3$. These traces, in the case of seismic signals, may be conventional magnetic or visual records which are duly processed in conventional equipment to provide analog or digital traces as necessary for processing in the manner hereinafter described.

It is noted that a mode selection switch S, with various gangs $S_A$ and $S_B$ both worked in unison, is employed to indicate the choice of five different refining signal processing combinations $S_1$—$S_5$. The system is first discussed from the viewpoint of switch position $S_1$ as shown in the drawing.

While it is recognized that a system can be constructed to automatically process the data as herein disclosed, this switch also schematically represents different processing routes and sequences if the method is performed manually or by use of a general purpose digital computer, etc.

Thus, the trace $T_1$, preferably that trace closest to the seismic source or the trace having the most accurate static correction, is chosen as a reference trace and is passed to cross-correlators 10, 11, etc. along with the respective remaining given traces $T_2$, $T_3$ to produce output cross-correlated traces $C_2$ and $C_3$ respectively. The cross-correlation may be done by the well-known process of multiplying amplitude increments, taken from each signal trace at small corresponding time intervals, with each other and adding the products over the duration of the signal traces. The resulting waveforms may have a configuration somewhat like the cross-correlated traces $C_2$—$C_6$ shown in FIG. 2.

The cross-correlated signal traces $C_2$ and $C_3$ are then convolved with corresponding given traces $T_2$ and $T_3$ in convolvers 14 and 15 to obtain convolution waveforms conv $_2$ and conv $_3$. The process of convolution is a standard procedure formerly referenced and comprises a filtering step which converts the frequency spectrum and phase of the traces $T_2$ and $T_3$ into a band-limited form. In this step the output convolved trace is phase-referenced to the reference trace $\Phi_1$ since the phase inputs $\Phi_2$ and $-\Phi_2$ of convolver 14 cancel.

As shown in FIG. 2 the signal traces $C_2$—$C_6$ have various time delays about the zero delay reference line or mid point of cross-correlation which are corrected in the form $C_2'$—$C_6'$ by means of the delay correction step 16. This can be done by visual inspection and manual alignment of traces located about a rotating drum, but preferably is done automatically such as by programming a digital computer to sense the peaks and to align the signals at the zero delay reference line or mid point.

As noted by signal trace $C_4'$, the polarity is reversed (as may happen by interchanging or switching detector leads, etc.) and is corrected in polarity correction step 17 as waveform $C_4''$, so that all the signals can be averaged, added, or stacked without unnecessary signal losses. This step also may be done manually, by digital programming, or with other equivalent automatic electronic devices. Thus, polarity corrected signal traces $C_2''$ and $C_3''$ are averaged in averager device 18 to produce averaged waveform $A^1$. This waveform is split into halves $A^2$ and $A^3$ about the central peak and one-half of $A^3$ is discarded. The other half $A^2$ is symmetrically reproduced about center to produce signal trace $A^4$. Thus, the symmetry step 19 comprises sensing the signal trace central peak at zero delay, discarding one-half on one side of this peak and graphically developing the symmetrical waveform, or similarly programming the required procedure on a digital computer to produce the waveform $A^4$ symmetrically on both sides of the central peak at zero delay. Thus, waveform $A^4$ is a symmetrized trace serving as a zero-phase band-limiting operator.

To complete the set of traces for an output collection, the symmetrical trace $A^4$ is convolved in convolver 13 with the reference trace $T_1$ to produce convolution conv $_1$ and provide a collection of traces 20 which may be used as output signals selected with a multiple gang switch (not shown). Note that the output signals may either be a single trace at terminal lead 21 or a collection at cable 20 as determined by appropriate position of the selection switch section $S_A$ and the cable switch section (not shown for simplicity purposes) which provides a connection to collection output terminals in positions $S_2$ and $S_3$ of switch section $S_A$ but which provides a single signal trace output at terminal lead 21 in positions $S_1$, $S_4$, and $S_5$.

Thus, in switch position $S_1$ the convolutions are stacked at 22 to produce a single trace and are deconvolved in filter step 23 to remove any ringing effects introduced by band limiting at the convolvers 13, 14, and 15.

Position $S_2$ of the switch merely changes the output from the single trace to the collection 20 for comparative viewing in side by side relationship.

Deconvolution consists of determining an inverse filter and convolving the received seismic trace with this inverse filter. The inverse filter to compensate for changes in the signal caused by the recording equipment (detectors, amplifiers, and recording medium) can be readily designed and applied since the instrumental constants are known. The basic problem is the filtering due to the earth, especially near the detectors and near the shot, and undesired signals such as multiple reflections. The design of this inverse filter is complex, and not an essential point of this application, but may be understood by reference to R. B. Rice, "Inverse Convolution Filters"; Geophysics, Vol. 27, No. 1, Feb. 1962, pp. 4—18.

In selection switch position $S_3$ section $S_B$ serves to additionally cross-correlate at 30 the reference trace $T_1$ with the signal trace $T_{21}$ stacked from the given signals at 31. It is noted that the normally processed traces 01, 02, and 03 are deconvolved to produce traces $T_1$, $T_2$, and $T_3$ which are merged at stacker 31. In this mode of operation the resulting cross-correlated signal $C_{21}$ serves as a reference to provide delay times at 33 of the collection of convolved signals 20 and provide the modified collection output signals 32 as selected by the unshown section of switch S.

Mode selection switch position $S_4$ serves in section $S_A$ to provide a single trace output signal at terminal 21 as derived from stacker 22, by way of the delay correction section $33_A$, and shifted by the delay from cross-correlator 30. In this respect switch section $S_B$ serves to cross-correlate the two stacked traces respectively from stackers 22 and 31.

The latter also holds true in mode selection switch position $S_5$ where, additionally, the output trace is convolved in convolver 40 with the cross-correlated signal trace $C_{21}$ to provide a single trace output at switch section $S_A$ and terminal lead 21.

The setting of the selector switch depends on the data to be processed. If the correction or time reference is precisely known for only one trace from a CRP (common reflection point) set of traces, then the use of this trace for a time reference is usually best and switch positions 1—2 would be used.

If all traces were stacked with poor corrections for most traces, the resulting stacked trace could be a poorer time reference than the original trace with a precise time reference. In general, this would be the case when the multiplicity of the coverage is low such as two, three, or four fold coverage.

If a higher multiplicity of coverage is required, such as 12 fold coverage, there will be an uphole time for every group of detectors. Moderately good static corrections would be available for all individual traces and the stacked trace would be a better time reference than any individual initial trace. Hence, under these conditions, the stacked trace should be used as the time reference ($S_{315}$).

In switch position 5, the filtered stacked trace from 22 also has its frequency response shifted to that of the stacked trace from 31. This provides an output trace with a broader response band since the signal from stacker 31 is not band limited.

A complete seismic system would include precise static and dynamic corrections introduced such as in box 9a ("Trace 01"). Switch positions 1 and 2 require only approximate static corrections and good dynamic corrections introduced in boxes 9b ("Trace 02") and 9c ("Trace 03").

The operation of the system cannot be a continuous flow in real time but must be sequential at certain steps. Some of the process could be made nearer real time if sensing of the data, shown in separate boxes for purposes of clarity, is combined into one multiplexed sequence.

If memory is included in the boxes, the flow can become logical, but some overall programming would expedite operation of the system. For example, trace 2 ($T_2$) would start into convolver 14 prior to completion of the cross-correlation in 10. Another delay would be introduced in zero delay correction 16 since the entire trace would have to be fed into this box before the maximum amplitude of the cross-correlation could be determined. Polarity sensing in 17 would either be done, as a subfunction, in 16 or an additional delay would be required.

Trace $T_1$ would normally be fed into convolver 13 prior to signal $A_4$. Stacker 22 could not output the stacked signal until all convolutions including conv $_1$ are fed into it.

It has been shown therefore that information content from sets of seismic and the like signals is provided in more useful form as a result of the novel method and system aspects afforded by this invention. Therefore, the features of novelty believed descriptive of the nature and spirit of the invention are defined with particularity in the appended claims.

We claim:

1. A method to be carried out exclusively by an automated data processing machine for modifying a given set of seismic input signals, comprising the steps of:
   1. generating in an automated data processing means a reference signal representative of the characteristics of at least one of said seismic input signals,
   2. cross-correlating in an automated data processing means at least one of the remaining input signals with said reference signal to form a set of cross-correlated signals, and
   3. generating in an automated data processing means at least one modified symmetrized signal having the characteristics of a zero-phase band-limiting operator from said cross-correlated signals.

2. A method as in claim 1 wherein step (3) includes the step of convolving the reference signal with the symmetrized signal in an automated data processing means thereby forming a convolved reference signal.

3. A method as in claim 1 further comprising the steps of stacking a plurality of said input signals to provide a stacked input signal in an automated data processing means, cross-correlating the stacked input signals with a stacked convolved signal in an automated data processing means and convolving the resulting cross-correlated signal with the stacked convolved signal in an automated data processing means.